(12) United States Patent
Dwork et al.

(10) Patent No.: US 7,676,454 B2
(45) Date of Patent: *Mar. 9, 2010

(54) PRIVATE CLUSTERING AND STATISTICAL QUERIES WHILE ANALYZING A LARGE DATABASE

(75) Inventors: Cynthia Dwork, San Francisco, CA (US); Frank David McSherry, San Francisco, CA (US); Yaacov Nissim Kobliner, Beer-Sheva (IL); Avrim L. Blum, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 346 days.

This patent is subject to a terminal disclaimer.

(21) Appl. No.: 11/069,116

(22) Filed: Mar. 1, 2005

(65) Prior Publication Data

US 2006/0200431 A1    Sep. 7, 2006

(51) Int. Cl.
G06F 7/00 (2006.01)
G06F 17/30 (2006.01)

(52) U.S. Cl. .............................. 707/3; 707/9; 707/101; 707/104.1

(58) Field of Classification Search ........................ None
See application file for complete search history.

(56) References Cited

U.S. PATENT DOCUMENTS

| | | | | |
|---|---|---|---|---|
| 6,253,203 | B1 * | 6/2001 | O'Flaherty et al. ............. | 707/9 |
| 2002/0010679 | A1 * | 1/2002 | Felsher ......................... | 705/51 |
| 2004/0139067 | A1 * | 7/2004 | Houle ........................... | 707/3 |
| 2006/0069749 | A1 * | 3/2006 | Herz et al. .................... | 709/219 |

OTHER PUBLICATIONS

Xintao Wu et al., Privacy Preserving Database Application Testing, Oct. 30, 2003, ACM, 118-128.*
Xintao Wu, Privacy Preserving Database Application Testing, Oct. 30, 2003, ACM.*
Xintao Wu et al., Privacy Preserving Database Application Testing, ACM, Oct. 2003.*
Cynthia Dwork, Privacy-Preserving Datamining on Vertically Partitioned Databases, Dec. 2004.*
Cynthia Dwork, Privacy-Preserving Datamining on Vertically Partitioned Databases, Dec. 2004.*

(Continued)

Primary Examiner—Pierre M Vital
Assistant Examiner—Loan T Nguyen
(74) Attorney, Agent, or Firm—Woodcok Washburn LLP (57) ABSTRACT

A database has a plurality of entries and a plurality of attributes common to each entry, where each entry corresponds to an individual. A query is received from a querying entity query and is passed to the database, and an answer is received in response. An amount of noise is generated and added to the answer to result in an obscured answer, and the obscured answer is returned to the querying entity. The noise is normally distributed around zero with a particular variance. The variance R may be determined in accordance with $R > 8 \, T \log^2(T/\delta)/\epsilon^2$, where T is the permitted number of queries T, $\delta$ is the utter failure probability, and $\epsilon$ is the largest admissible increase in confidence. Thus, a level of protection of privacy is provided to each individual represented within the database. Example noise generation techniques, systems, and methods may be used for privacy preservation in such areas as k means, principal component analysis, statistical query learning models, and perceptron algorithms.

21 Claims, 4 Drawing Sheets

OTHER PUBLICATIONS

Xintao Wu et al., Privacy Preserving Database Application Testing, ACM, Oct. 2003.*

Dinur, I. et al., "Revealing Information while Preserving Privacy", *Pods*, 2003, 202-210.

Dwork, C. et al., "Privacy-Preserving Datamining on Vertically Partitioned Databases", *Crypto, The 24th Annual International Cryptology Conference*, 2004, 528-544.

* cited by examiner

PRIVATE CLUSTERING AND STATISTICAL QUERIES WHILE ANALYZING A LARGE DATABASE

CROSS REFERENCE TO RELATED APPLICATIONS

This application shares some subject matter with co-owned U.S. Patent Application No. 2006/0161527, filed Jan. 18, 2005, and is incorporated herein by reference in its entirety.

FIELD OF THE INVENTION

The present invention relates generally to the field of preserving privacy with respect to information in a database, and, more particularly, to allowing a large database to be analyzed while deterring a querying entity from identifying individuals in the database and from gaining sensitive knowledge about individuals.

BACKGROUND OF THE INVENTION

Oftentimes it is desirable to be able to analyze a database to learn statistical information about a population as represented by the database. Typically, a query to such a database is of the form "How many members of a set of entries/rows in the database satisfies a particular property?", where such property may be expressed as a Boolean formula or as some more complex formula.

For example, it may be desirable with regard to a particular database to statistically determine within the population represented thereby whether a correlation may be found between two factors or sets of factors, such as whether, with regard to a medical database, patients who have heart disease also have a history of smoking tobacco. In particular, a query to a medical database might be fashioned to answer a question such as: "How many individuals as represented within the database are tobacco smokers?", "How many individuals as represented within the database have heart disease?", "How many individuals as represented within the database are tobacco smokers that suffer from heart disease?", and the like.

However, and significantly, it is oftentimes necessary based on a legal or moral standard or otherwise to protect the privacy of individuals as represented within a database under statistical analysis. Thus, a querying entity should not be allowed to directly query for information in the database relating to a particular individual, and also should not be allowed to indirectly query for such information either.

Given a large database, then, perhaps on the order of hundreds of thousands of entries where each entry corresponds to an individual, a need exists for a method to learn statistical information about the population as represented by such a database without compromising the privacy of any particular individual within such population. More particularly, a need exists for such a method by which an interface is constructed between the querying entity and the database, where such interface obscures each answer to a query to a large-enough degree to protect privacy, but not to such a large degree so as to substantively affect statistical analysis of such database.

A recent method uses two algorithms that permit data mining while maintaining privacy. It has been shown in a single attribute database that adding a small amount of noise to a query will preserve privacy, where the total number of queries is sub-linear in the size of the database. A previous approach to calculating the amount of noise to be added to preserve privacy returned only binary values (0,1) as results. It would be desirable if the restraint of 0 or 1 as results was removed.

A more-developed discussion of prior techniques may be found in *Privacy-Preserving Datamining on Vertically Partitioned Databases*, Dwork and Nissim, CRYPTO 2004—The 24th Annual International Cryptology Conference, Aug. 15-19, 2004, Santa Barbara, Calif., USA, Proceedings, page 528, Springer-Verlag, ("Dwork and Nissim") hereby incorporated by reference in its entirety, and therefore need not be set forth herein in any further detail.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The aforementioned needs are satisfied at least in part by the present invention in which systems and methods are provided in connection with a database having a plurality of entries and a plurality of attributes common to each entry, where each entry corresponds to an individual. An example method is for providing a level of protection of privacy of the individual. In the example method, a query is received from a querying entity query and is passed to the database, and an answer is received in response. An amount of noise is generated and added to the answer to result in an obscured answer, and the obscured answer is returned to the querying entity. The amount of noise is determined using a centered normal distribution, defined by a variance R, for example.

According to aspects of the invention, R is determined in accordance with $R > 8 T \log^2(T/\delta)/\epsilon^2$, where T is the permitted number of queries T, $\delta$ is the utter failure probability, and $\epsilon$ is the largest admissible increase in confidence.

According to additional embodiments and aspects of the invention, example noise generation techniques, systems, and methods may be used for privacy preservation in such areas as k means, principal component analysis, statistical query learning models, and perceptron algorithms.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Example Computing Environment

Figure 1:
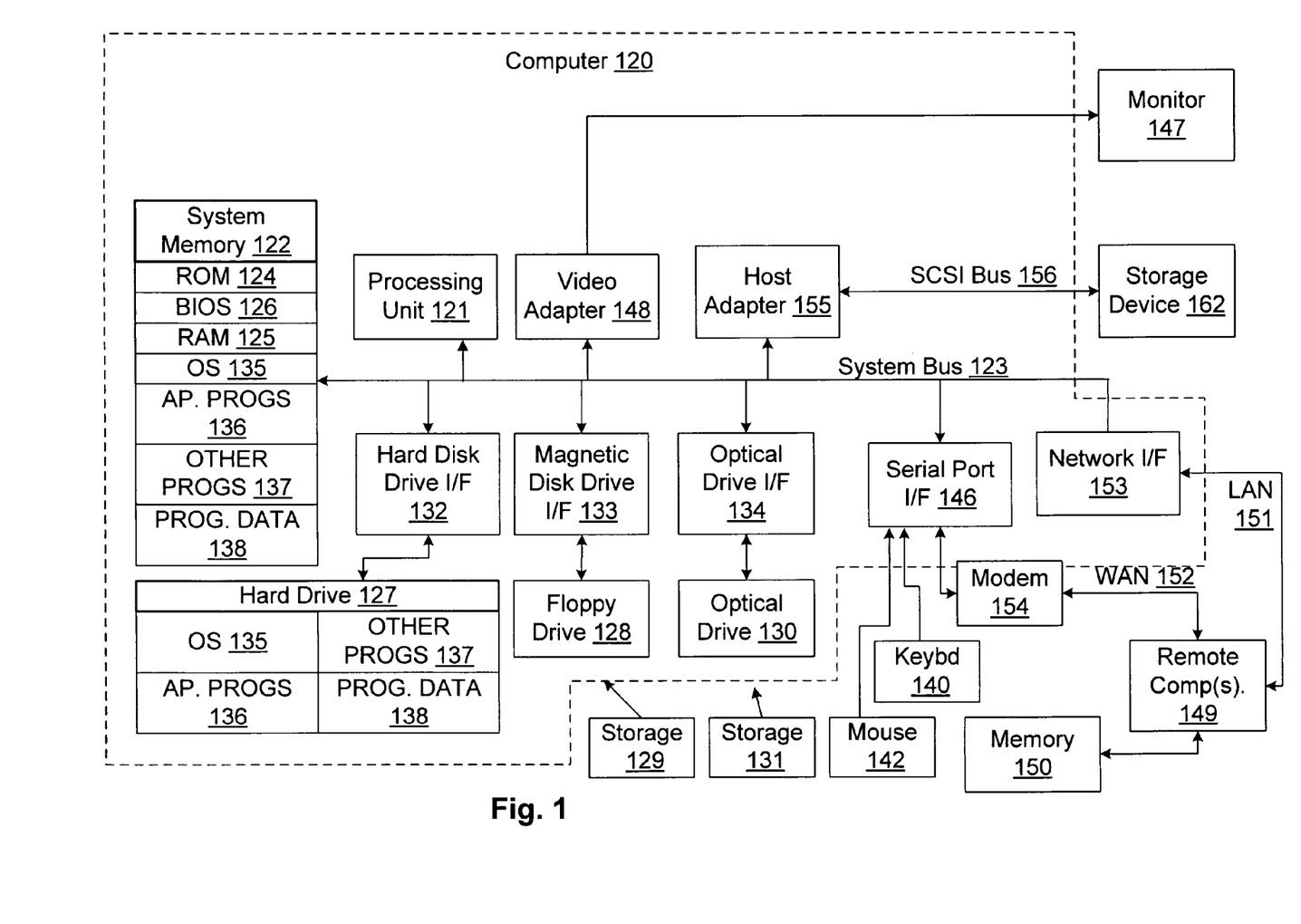
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Example Privacy Preservation

Figure 2:
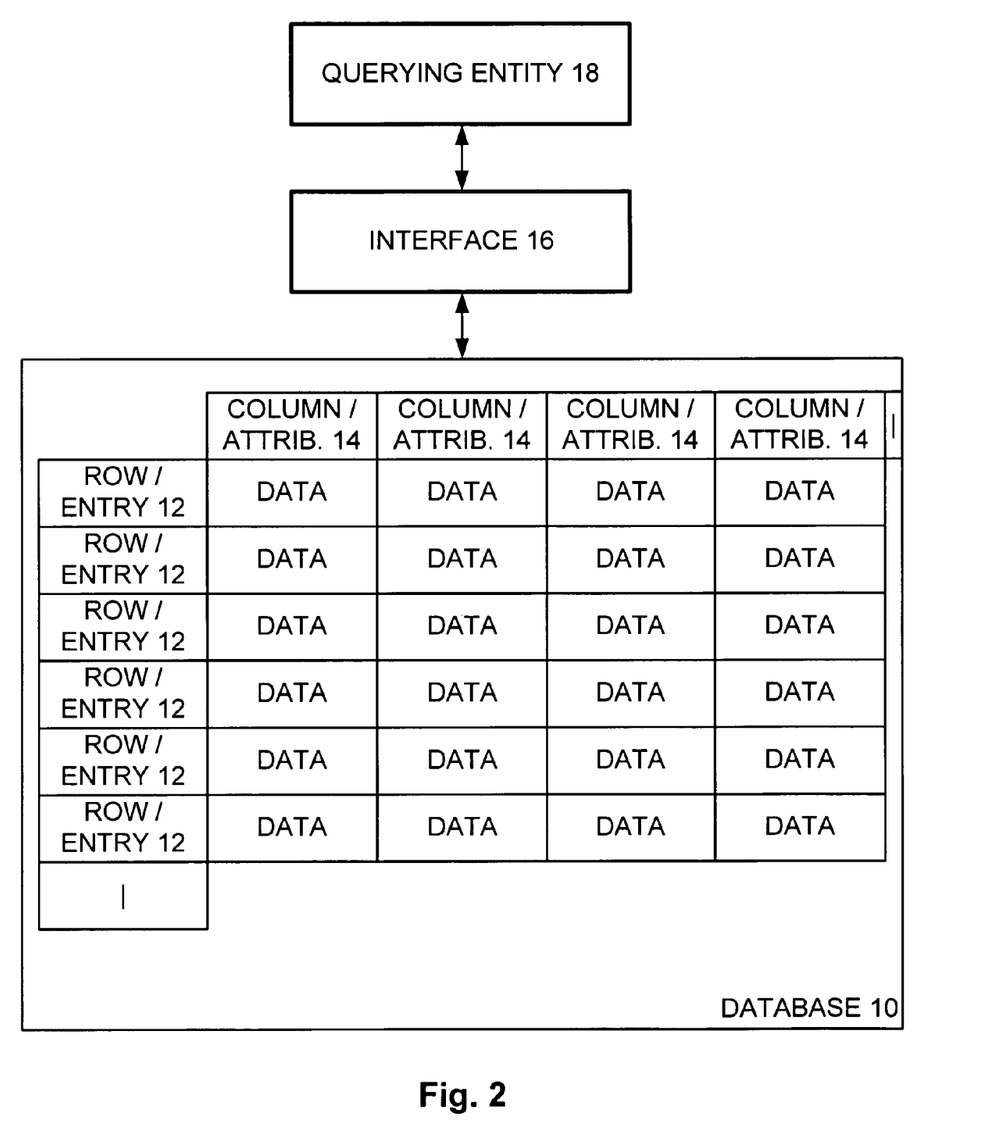
FIG. 2 is a block diagram showing a database such as that which may be employed in connection with the present invention and an interface for allowing a querying entity access to the database.

Referring now to FIG. 2, it is seen that the present invention ensures privacy with regard to information in a database 10. Such database 10 may be any database 10 without departing from the spirit and scope of the present invention, although for purposes of ease it is enough to presume for now that the database 10 is tabular in form with each row 12 representing an entry corresponding to a particular individual, and each column 14 representing an attribute with respect to the individual. For example, it may be that a first column/attribute 14 represents whether the individual corresponding to the row/entry 12 is a tobacco smoker, and that a second column/attribute 14 represents whether the individual corresponding to the row/entry 12 has heart disease. For either column/attribute 14 with regard to a particular row/entry 12 in the database 10, data may be represented in any type of format, and is not limited to a 0/1 binary format.

As also seen in FIG. 2, and in one embodiment of the present invention, an interface 16 is provided between a querying entity 18 and the database 10, where such interface 16 obscures each answer to a query as reported to the querying entity 18 to a large-enough degree to protect privacy, but not to such a large degree so as to substantively affect statistical analysis of such database.

Typically, the interface 16 receives each query from the querying entity 18 in the form of a function q(s, f), where s is a definition of the entries/rows 12 of the database 10 that are the focus of the query, and f is a definition of a function that is to be applied to each such defined entry/row 12 of the database 10. To preserve privacy, some noise is desirably added to the result of the function, and this "noisy" answer is provided to the querying entity 18.

Thus, in an effort to provide privacy to individuals represented in the entries 12 of the database 10, the interface 16 in the course of returning a query result to a querying entity adds a small amount of error or "noise" to the query result to obscure the query result to a large-enough degree to protect privacy, but not to such a large degree so as to substantively affect statistical analysis of such database 10.

Dwork and Nissim show that a strong form of privacy can be maintained using a small amount of noise, provided the total number of queries is sublinear in the number n of database rows. This is referred to as a sub-linear queries (SuLQ) database. The assumption of sublinearity becomes reasonable as databases grow increasingly large.

Techniques are used in accordance with the present invention that enable results to be returned over a continuous range, as opposed to producing only binary values (0,1) as results. A centered normal distribution is used, and is defined by a variance R, where R is chosen sufficiently large to conceal particulars of the query, but not so large as to render the result useless. Such techniques enable applications to k means, principal component analysis, and the statistical query learning method, for example, all of which may use variations of the techniques to return results for the specific application.

Aspects of this invention extend the work of Dwork and Nissim to handle queries whose domain is more general than $\{0,1\}^d$, and which may return arbitrary real numbers between 0 and 1, rather than just the values 0 or 1. This allows much greater generality in the algorithms and techniques, which can now operate on arbitrary data (e.g., real numbers, strings, categorical data, etc.). Thus, privacy can be applied to real-valued functions f.

As noted above, the exact sum of the supplied function applied to each row is computed, and then a random quantity is added in to mask the particulars of the answer. However, previously a discrete distribution was used that fit the $\{0,1\}$ functions well, but this cannot be generalized. A continuous distribution is described that may be generalized using a centered normal distribution, which is defined by a variance R. The particular choice of R may depend on several parameters, such as the permitted number of queries T, the "utter failure" probability $\delta$, the "individual failure" probability $\gamma$, and the largest admissible increase in confidence $\epsilon$.

For example, it is desirable to use N(0,R) to refer to a random number distributed according to a zero mean normal with variance R=R($\epsilon,\delta$,T). In such case, an input query of g: D→[0,1], for example, will return $\Sigma_i$ g($d_i$)+N(0,R), where $d_i$ are random and independent elements drawn from an arbitrary domain D. Thus, an extension is provided from Boolean functions on the domain $\{0,1\}^k$ to bounded functions on arbitrary domains. By choosing $R > 8 \, T \log^2(T/\delta)/\epsilon^2$, the result will be ($\epsilon,\delta$,T)-private for all $\epsilon,\delta$,T.

Alternately, by choosing $R > 8 \log(1/2\gamma)\log(T/\delta)T/\epsilon^2$, it is the case that with probability 1−$\delta$, for any fixed row and predicate, after any T queries, with probability 1−$\gamma$, the confidence in the value of the predicate applied to that row does not increase by more than $\epsilon$.

Thus, the value of R grows "linearly" with the number of permitted queries, and logarithmically with the failure probabilities, and quadratically with the admissible increase in confidence.

Figure 3:
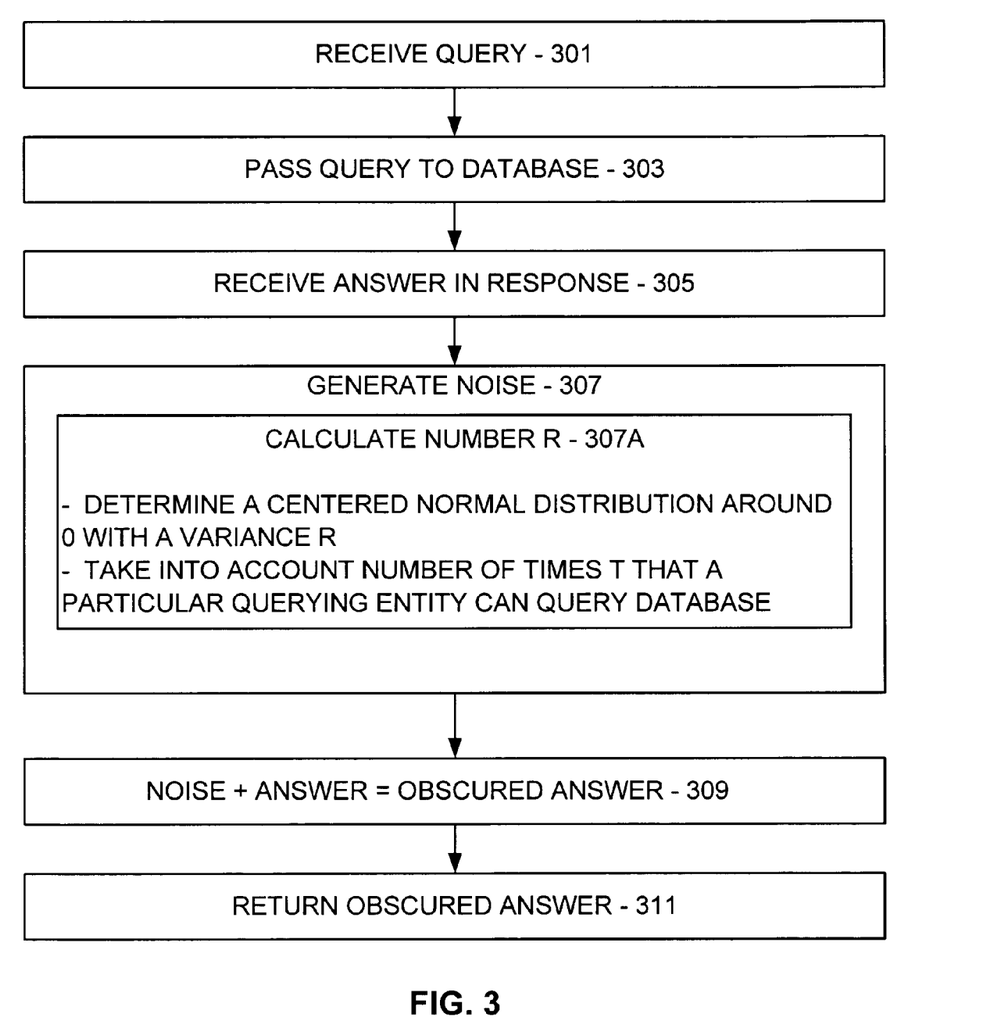
FIG. 3 is a flow diagram showing exemplary steps performed by the interface of FIG. 2 in responding to a query for the database from the querying entity in accordance with one embodiment of the present invention so as to preserve a level of privacy with respect to data stored in the database.

In one embodiment of the present invention, and turning now to FIG. 3, the interface 16 operates in the following manner. Preliminarily, the interface 16 receives from the querying entity 18 a query (step 301), passes the query to the database 10 (step 303), and receives in response an answer (step 305). Thereafter, the interface 16 generates the added noise (step 307), adds the noise to the answer to result in an obscured answer (step 309), and returns the obscured answer to the querying entity (step 311).

In order to generate the added noise as at step 307 to be an appropriate magnitude, and in one embodiment of the present invention, the interface 16 determines a centered normal distribution around 0 with variance R, which is expressed in terms of T (the permitted number of queries), as set forth above, for example.

While the aforementioned method maintains some measure of privacy with regard to the individuals represented within the entries 12 of the database 10, it is to be understood that, almost by definition, any query against the database results in some loss of privacy. That is, the simple act of gaining an answer, even an obscured answer, means that something that was formerly not public is now in fact public. Accordingly, in one embodiment of the present invention, calculating R as at step 307a is performed by the interface 16 by taking into account a perceived amount of loss of privacy that is considered acceptable.

Example Applications of the SuLQ Primitive

The example SuLQ operation—query and noisy reply—can be viewed as a noisy computational primitive that may be used to determine more advanced functions of a database than statistical queries. An exemplary calculus of noisy computation in accordance with the present invention yields privacy-preservation in various applications, such as singular value decomposition and optimal projections, clustering via a noisy variant of the k means algorithm, principal component analysis, classification via a noisy variant of the perceptron algorithm, and a compiler to transform any learning algorithm in the statistical query model to a SuLQ version, for example.

Figure 4:
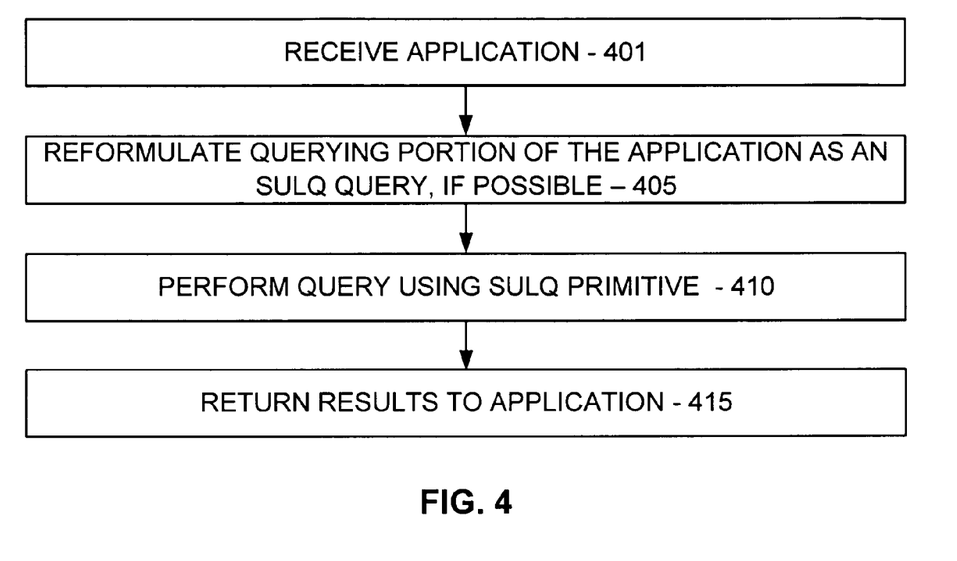
FIG. 4 is a flow diagram of an exemplary technique of incorporating the sub-linear queries (SuLQ) primitive into an application in accordance with the present invention.

FIG. 4 is a flow diagram of an exemplary technique of incorporating the SuLQ primitive into an application. At step 401, the application is received. At step 405, a portion of the application that references a database is reformulated as a query for a SuLQ database, if suitable. The query is then performed using the SuLQ primitive at step 410, and then the result is sent back to the application for analysis in accordance with the application's typical processing at step 415.

In the examples below, the rows of the database are drawn from $[0,1]^d$, although it is apparent how to generalize to other domains.

Singular Value Decomposition and Optimal Projections

Many powerful data mining and data filtering tasks make use of the singular value decomposition of an incidence matrix associated with the data. Given an n×d matrix A whose rows are the rows of the database, latent semantic indexing, principal component analysis, and many types of spectral clustering operate by projecting data elements (e.g., rows) onto the space spanned by the top k right singular vectors of A, these being the top k eigenvectors of the matrix $A^T A$. Given the matrix $A^T A$, the eigenvalues can be computed using standard techniques from numerical analysis.

Because $d_i$ is the ith row of A, the matrix $A^T A$ may be written as $A^T A = \Sigma_i d^T_i d_i$, where $d^T_i d_i$ is the outer product of $d_i$. In accordance with the present invention, for $d^2$ queries, approximate $A^T A = \Sigma_i d^T_i d_i$ by determining C=SuLQ(f $(d_i) := d^T_i d_i$). Then determine and return the top k eigenvectors of C.

While C is not exactly $A^T A$, and therefore the computed eigenvectors are not exactly correct, eigenvectors are known to be robust in the presence of independent, zero-mean noise. It is noted that an exemplary computation in accordance with the present invention can be carried out even if each column of the database is stored in a separate, independent, SuLQ database.

Principal Component Analysis

Principal component analysis (PCA) is a related technique that uses the space spanned by the top k right singular vectors of the matrix A, with the mean of the rows, denoted μ, subtracted from each. These are the top k eigenvectors of the covariance matrix A, or equivalently, of $\Sigma_i (d_i - \mu)^T (d_i - \mu)$. An accurate approximation of μ can be computed with only d additional queries, and then the technique described above may be used with C=SuLQ(f($d_i$):=$(d_i - \mu)^T (d_i - \mu)$), where μ is the approximation that was determined.

In an example PCA embodiment, an input is n points in $U^d$, and an output is a d×d covariance matrix. For $1 \leq i \leq d$, let m[i]=expectation, over all points p[r], of p[r](i), where p[r](i) denotes the ith coordinate of the input point described by row r (denoted p[r]). Let the d by d covariance matrix C be defined by C={c[ij]}, where C[ij]=expectation over r (p[r](i)·p[r](j)−m[i]m[j].

An exemplary SuLQ PCA technique for d queries may be as follows. For $0 \leq i \leq d$, let m[i]=SuLQ(F(x):=x(i))/n. This means that F(x) selects the ith coordinate of each row, so the query sums all the ith coordinates (getting a noisy version of this sum), and this noisy sum is divided by n. This gives an approximation to m[i].

For roughly d squared queries, an exemplary PCA technique may be as follows. Let c_[ij]=SuLQ(F(x)=x(i)x(j))/n−m[i] m[j]. That is, first obtain a noisy average of the product of the ith and jth coordinates, and then subtract the product of the estimates of m[i] and m[j].

The error matrix has properties such as mean 0, independent random variables, common variance, and Gaussian-shaped distribution. Once the PCA has been performed, other algorithms, techniques, or processes may be run in the lower-dimensional subspace.

k Means

In an example k means embodiment, assume the input is n points in U (the d-dimensional cube of side length l), parameter k, and k initial "means" in U, and assume the output to be k points in U (the "means"), together with the fraction of points in the database associated with each mean and the covariance matrix. Points are associated with one of the k centers, and each center is updated as the average of its points. The number of points associated with each center is determined, and then the new centers are determined.

For k queries, an example technique comprises for each mean, the number of points that are closer to this mean than to every other mean is determined. This in turn yields cluster sizes, and may be performed via a SuLQ query Size[i]=SuLQ (F(x):=1 if m[i] is the closest mean to x, and 0 otherwise).

For kd queries, an example technique comprises for each mean m and coordinate j, the sum is computed over all the points in the cluster associated with m, the value of the jth coordinate. This is divided by the size of the cluster, and may be performed via the following SuLQ queries:

a. Sum[ij]=SuLQ(F(x):=x(j) if m[i] is the closest center to x, and 0 otherwise).

b. m_[ij]=Sum[ij]/Size[i]

The steps are iterated until a maximum number of queries is reached. If any cluster size is below a threshold (e.g., the square root of T(n)), then an exception may be outputted.

Compiler for Algorithms in the Statistical Query Learning Model

The statistical query model is a framework for examining statistical algorithms executed on samples drawn independently from an underlying distribution. In this framework, an algorithm repeatedly specifies a predicate f and an accuracy T, and is returned the expected fraction of samples satisfying f to within additive error T.

It has been determined that any concept that is learnable in the statistical query model is privately learnable using an equivalent process on a SuLQ database. The emulation of a statistical query primitive is desirably performed by executing a sufficient number of queries so that the accuracy is within the allotted T. Thus, for example, given as input a predicate p and accuracy T, initialize tally to 0, then repeating $t \geq R/Tn^2$ times, set tally=tally+SuLQ(f($d_i$):=p($d_i$)). Tally/Tn is then returned.

Put another way, in a conventional statistical queries learning model, the goal is to learn a concept, which is a function mapping d-bit strings to {0,1}. There is an underlying distribution D on d-bit strings, and the learning algorithm has access to an oracle, stat[c,D].

With reference to this oracle, on query (f,tol), where f=f(x, L) is any boolean function over inputs x∈D and binary label L, tol=1/poly(d) is an error tolerance, the oracle replies with a noisy estimate of the probability that f(x,c(x))=1 for a randomly selected element from D. The answer is guaranteed to be correct within additive tolerance tol.

In accordance with the present invention, it is desirable that one of the attributes be the value of c applied to the other data in the row, so that a typical row looks like DB[r]=(x,c(x)). By definition, on input (f,S) the SuLQ database responds with a noisy version of the sum over all rows r in S of f(DB[r]). Taking S=[n], so long as the noise added by the SuLQ database is within the tolerance tol, the response (divided by n) is a "valid" response of the stat[c,D] oracle. In other words, to simulate the query stat[c,D](f tol), compute SuLQ}}(F(x):=f (x))/n a total of R times the square of (tol·n) times, and return the average of these values. With high probability the answer obtained will be within tolerance tol. Also, note that tol=1/poly(d); if d=no(1), then repetition is not necessary.

SuLQ Perceptron

With respect to an exemplary technique involving a SuLQ perceptron, p is a point in space $R^d$ and L is a label in $\{-1,+1\}$. The conventional version of the perceptron algorithm is (1) initialize w in $R^d$ randomly; (2) while there is a labeled point (p,L) such that $w^T p \cdot L < 0$, set w=w+Lp. This repeatedly takes erroneously classified points and incorporates the correct direction into the vector w. Aspects of the present invention adapt this to the SuLQ setting as (1) initialize w in $R^d$ randomly; (2) while (not converged), let p=SuLQ(F(x):=x·L if and only if $w^T x \cdot L < 0$) Let n=SuLQ(F(x):=1 if and only if $w^T x \cdot L < 0$). Add p/n to w. If $n \gg \sqrt{T}$ then not converged.

This is desirably performed using an extension of F(x) to vector values, which can be done with d queries.

An exemplary process incorporates into w a noisy average of all points that are currently misclassified. If there are not sufficiently many, the process desirably stops, as it is no longer expected that the aggregates reflect substance rather than noise.

Conclusion

The present invention may be practiced with regard to providing privacy when statistically analyzing any appropriate database. As should now be appreciated, with the present invention as set forth herein, such statistical analysis may be performed while maintaining a reasonable amount of privacy of individuals represented within the database.

The programming necessary to effectuate the processes performed in connection with the present invention is relatively straightforward and should be apparent to the relevant programming public. Accordingly, such programming is not attached hereto. Any particular programming, then, may be employed to effectuate the present invention without departing from the spirit and scope thereof.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A method for preserving privacy of data in a database, comprising:
    providing a query to a sub-linear queries (SuLQ) database;
    receiving a query result from the SuLQ database in response to the query;
    generating an amount of noise to add to the query result using a centered continuous normal distribution, defined by a variance R, wherein R is chosen to obscure the query result without rendering the query result useless; and
    adding the amount of noise to the query result to result in an obscured query result.

2. The method of claim 1, wherein the variance R is responsive to a permitted number of queries.

3. The method of claim 1, wherein the variance R is responsive to a failure probability.

4. The method of claim 1, wherein the variance R is responsive to a largest admissible increase in confidence.

5. The method of claim 1, wherein R is determined in accordance with $R > 8 T \log^2(T/\delta)/\epsilon^2$, where T is the permitted number of queries T, $\delta$ is the utter failure probability, and $\epsilon$ is the largest admissible increase in confidence.

6. The method of claim 1, wherein generating the amount of noise comprises generating noise that obscures the query result to a large enough degree to protect privacy, but not to such a large degree as to affect statistical analysis of the database.

7. The method of claim 2, wherein the permitted number of queries to the SuLQ database is sublinear to the number of database rows.

8. The method of claim 1, wherein the obscured query result is an arbitrary real number between 0 and 1.

9. The method of claim 1, wherein the query is applied to arbitrary data comprising at least one of real numbers, strings, and categorical data.

10. The method of claim 1, wherein the query comprises a real-valued function.

11. A method of preserving privacy, comprising:
    receiving a portion of an application that references a database;
    reformulating the portion of the application as a query for a sub-linear queries (SuLQ) database; and
    performing the query pursuant to a sub-linear queries (SuLQ) primitive which comprises receiving a query result from the database and generating an amount of noise to add to the query result to result in an obscured query result, wherein the amount of noise added to the query result is chosen to obscure the query result without rendering the query result useless.

12. The method of claim 11, wherein the application comprises singular value decomposition and optimal projections.

13. The method of claim 11, wherein the application comprises a k means application.

14. The method of claim 11, wherein the application comprises principal component analysis.

15. The method of claim 11, wherein the application comprises a perceptron algorithm.

16. The method of claim 11, wherein the application comprises a statistical query model.

17. A computer readable medium having computer executable instructions stored thereon for performing a method comprising:
    providing a query to a sub-linear queries (SuLQ) database;

receiving a query result from the SuLQ database in response to the query;

generating an amount of noise to add to the query result using a centered continuous normal distribution, defined by a variance R, wherein R is chosen to obscure the query result without rendering the query result useless; and adding the amount of noise to the query result to result in an obscured query result.

18. The computer readable medium of claim 17, wherein R is determined in accordance with $R > 8\, T\, \log^2(T/\delta)/\epsilon^2$, where T is the permitted number of queries T, $\delta$ is the utter failure probability, and $\epsilon$ is the largest admissible increase in confidence.

19. The computer readable medium of claim 17, wherein generating the amount of noise comprises generating noise that obscures the query result to a large enough degree to protect privacy, but not to such a large degree as to affect statistical analysis of the database.

20. The method of claim 1, wherein the method is applied for statistical analysis of the database.

21. A method for preserving privacy of data in a database, comprising:

providing a plurality of queries to a sub-linear queries (SuLQ) database, wherein a total number of queries to the SuLQ database is sublinear to a number of database rows;

receiving a query result from the database in response to one of said queries from the sub-linear queries (SuLQ) database;

generating an amount of noise to add to the query result using a centered continuous normal distribution, defined by a variance R, wherein R is chosen to obscure the query result without rendering the query result useless;

adding the amount of noise to the query result to result in an obscured query result, wherein the amount of noise obscures the query result to a large enough degree to protect privacy, but not to such a large degree as to affect statistical analysis of the database; and performing an SuLQ perceptron algorithm to determine that an aggregate of all data points incorporated as noise reflect usable data retrieved from the SuLQ database.

* * * * *